A. J. SPRANGER.
HUB CONSTRUCTION.
APPLICATION FILED APR. 11, 1918.
1,287,493.
Patented Dec. 10, 1918.
2 SHEETS—SHEET 1.
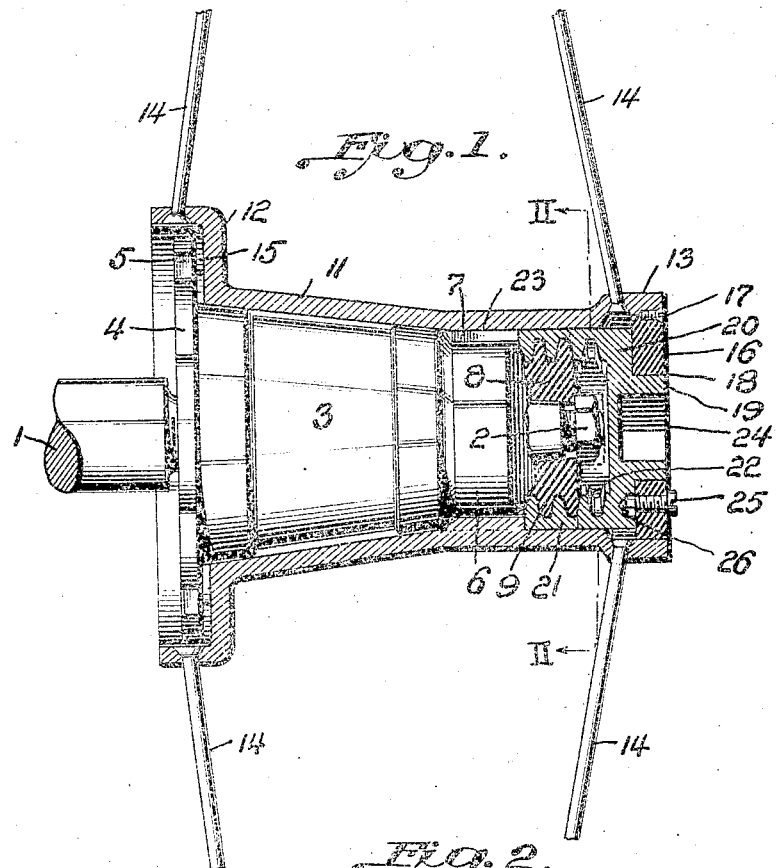
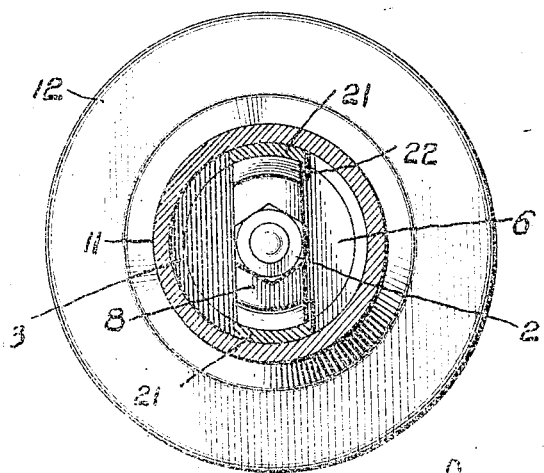
Inventor
ANTHONY J. SPRANGER

A. J. SPRANGER.
HUB CONSTRUCTION.
APPLICATION FILED APR. 11, 1918.

1,287,493.

Patented Dec. 10, 1918.
2 SHEETS—SHEET 2.

Anthony J. Spranger
Inventor

By
Attorneys

UNITED STATES PATENT OFFICE.

ANTHONY J. SPRANGER, OF DETROIT, MICHIGAN.

HUB CONSTRUCTION.

1,287,493.   Specification of Letters Patent.   Patented Dec. 10, 1918.

Application filed April 11, 1918. Serial No. 228,066.

*To all whom it may concern:*

Be it known that I, ANTHONY J. SPRANGER, a citizen of the United States of America, residing at Detroit, in the county of Wayne and State of Michigan, have invented certain new and useful Improvements in Hub Constructions, of which the following is a specification, reference being had therein to the accompanying drawings.

This invention relates to hub constructions for vehicle wheels, and the primary object of my invention is to provide positive and reliable means, in a manner as hereinafter set forth, for securing a demountable wheel on the end of an axle, so that the same may be easily and quickly removed, when it is desired to substitute another wheel therefor.

A further object of my invention is to provide a demountable wheel hub construction wherein the parts are constructed with a view of reducing the cost of manufacture and at the same time retain those features by which durability, safety, and ease of assembling are secured. With such ends in view, the invention resides in the novel construction to be hereinafter referred to and then claimed.

Reference will now be had to the drawings, wherein—

Figure 1 is a longitudinal sectional view of the hub construction, showing the inner hub partially in elevation;

Fig. 2 is a cross sectional view taken on the line II—II of Fig. 1;

Figure 3:
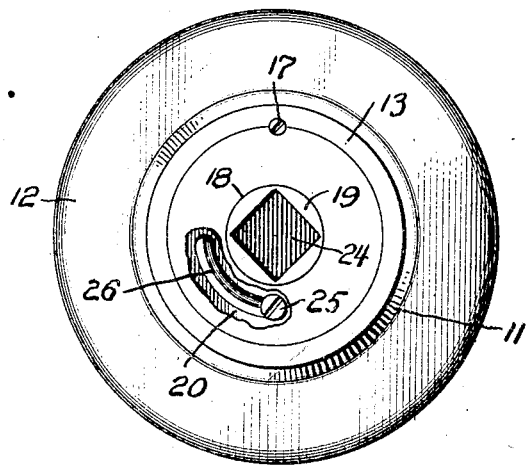
Fig. 3 is a view of the outer end of the hub construction, partly broken away.
Figure 7:
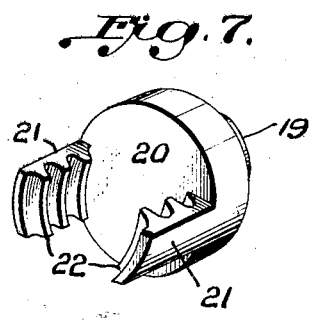
Fig. 7 is a perspective view of a detached cap.

In the drawings, the reference numeral 1 denotes the end of an axle, and fixed thereon by a nut 2 or other fastening means is a tapering inner hub 3, which has the inner end thereof provided with a peripheral flange 4 and lugs 5 radiating from said flange.

Figure 6:
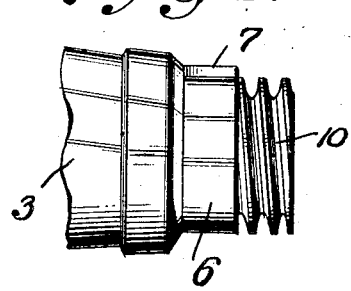
Fig. 6 is a similar view of a portion of the inner hub, illustrating a slight modification of my invention.
Figure 4:
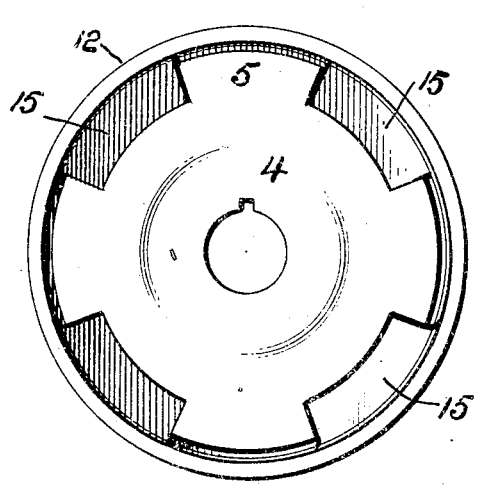
Fig. 4 is a view of the inner end of the hub construction.
Figure 5:
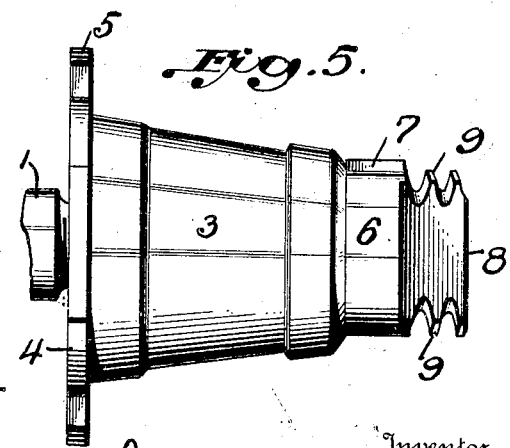
Fig. 5 is a side elevation of the inner hub.

The outer end of the inner hub 3 terminates in a neck 6 having one or more ribs 7 and a tang 8, said tang having the longitudinal rounded edges thereof provided with teeth or threads 9. The tang 8 corresponds somewhat to a mutilated bolt, but as shown in Fig. 6, the tang may be cylindrical and exteriorly screwthreaded, as at 10.

The reference numeral 11 denotes an outer hub which may represent the hub of a wheel having wood or wire spokes, and as shown, the inner and outer ends of said outer hub have annular flanges 12 and 13 to which are connected wire spokes 14. The flange 12 at the inner end of the outer hub has a plurality of lugs 15 between which extend the lugs 5 of the inner hub 3, so as to establish a driving relation between the inner and outer hubs.

The reference numeral 16, denotes a retaining ring fixed in the outer end of the outer hub 11, said retaining ring being retained in the annular flange 13 by a screw 17 or other fastening means. The retaining ring 16 has a concentric circular opening 18 into which extends the cylindrical shank 19 of a rotatable cap 20. The cap 20 is rotatable in the outer end of the outer hub 11 and the inner end of said cap has opposed segment shaped members 21 with the inner walls thereof provided with threads or teeth 22, corresponding in pitch to the threads or teeth 9 of the inner hub 3.

The outer hub 11 has one or more grooves 23, to receive the rib 7 of the inner hub 3, and this rib will correctly position the inner and outer hubs so that the lugs 5 and 13 of said hubs will be correctly positioned for establishing a driving relation between said hubs. The cap 20 provides clearance for the end of the axle 1, and the shank 19 of said cap has a rectangular socket 24 adapted to receive a key or wrench to facilitate rotating the cap 20.

The retaining ring 16 has a set screw 25 extending into a segment groove 26 in the outer face of the cap 20 and by tightening the set screw 25 the cap 20 may be fixed relative to the retaining ring 16.

With the set screw 25 loose and engaging in one end of the groove 26, the threaded members 21 of the cap 20 are out of engagement with the threads 9 of the tang 8, that is, the members 21 confront the flat facets of the tang, and the outer hub 11 can be withdrawn from the inner hub 3. It is in this manner that the wheel may be easily and quickly demounted, and when the wheel is replaced on the inner hub 3, it is only necessary to partially rotate the cap 20 to place the members 21 in engagement with the threaded portion of the tang 8. The movement of the cap 20 is limited by a set screw 25 engaging in the opposite end of the groove 26, also by the threads or teeth of the members 21 becoming interlocked or wedged against the teeth or threads 9 of the tang 8. The set screw 25 may then be tightened to hold the cap 20 in its adjusted position.

In case the inner hub 3 has the tang with peripheral teeth or threads, it is necessary to rotate the cap 20 to draw the outer hub 11 on to the inner hub, in which instance the groove 26 will be dispensed with and the set screw 25 bind against the face of the cap 20.

While in the drawings there are illustrated the preferred embodiments of my invention, it is to be understood that the structural elements are susceptible to such changes as fall within the scope of the appended claim.

What I claim is:—

In a hub construction for demountable wheels, the combination with an inner hub having the outer end thereof provided with a threaded tang and a longitudinally disposed rib, an outer hub on said inner hub and having its inner end detachably interlocked with the inner end of said inner hub, said outer hub having a groove to receive the rib of said inner hub, and thereby correctly position the interlocked inner ends of said outer and inner hubs, a retaining ring fixed in the outer end of said outer hub, a cap rotatable in the outer end of said outer hub against said retaining ring and having a wrench receiving portion extending through said retaining ring, opposed threaded members carried by said cap adapted to interlock with the threaded tang of said inner hub, and a set screw carried by said cap and extending through said retaining ring and adapted to be fixed relative to said retaining ring to hold said cap in adjusted positions.

In testimony whereof I affix my signature in the presence of two witnesses.

ANTHONY J. SPRANGER.

Witnesses:
ANNA M. DORR,
KARL H. BUTLER.